United States Patent [19]

Mathieu

[11] 4,167,646

[45] Sep. 11, 1979

[54] VIBRATION DAMPER

[75] Inventor: Charles Mathieu, Rain, Austria

[73] Assignees: Willy Frankel; Claudia Frankel, both of Englewood Cliffs, N.J.

[21] Appl. No.: 871,225

[22] Filed: Jan. 23, 1978

[51] Int. Cl.[2] .............................................. H02G 7/14
[52] U.S. Cl. ........................................ 174/42; 188/1 B
[58] Field of Search ........................... 174/42; 188/1 B

[56] References Cited

U.S. PATENT DOCUMENTS

| | | | |
|---|---|---|---|
| 3,597,522 | 8/1971 | Kobayashi | 174/42 |
| 3,978,276 | 8/1976 | Poffenberger et al. | 174/42 |

FOREIGN PATENT DOCUMENTS 570780  2/1959  Canada ....................................... 174/42

*Primary Examiner*—Laramie E. Askin
*Attorney, Agent, or Firm*—James J. Romano, Jr.

[57] ABSTRACT

New and improved vibration damper, primarily for power cables, is disclosed and comprises two damper elements having interfaces of vibrational energy absorbing materials in the nature of rubber, and two rigid absorber arm and weight assemblies pivotally connected thereto. In use, vibrational energy is transmitted from the cable by, and under the vibrational energy absorbing restraint of, the interfaces to the absorber arm and weight assemblies for damping of the same. The absorber arms are of unequal length to provide two natural frequencies for the damper, and the vibration weights are readily removable for replacement by weights of different mass to adapt the same basic vibration damper to a wide variety of applications.

15 Claims, 3 Drawing Figures

VIBRATION DAMPER

BACKGROUND OF THE INVENTION

1. Field of the Invention.

This invention relates to a new and improved vibration damper which is particularly, though not exclusively, adapted for use in the damping of wind generated or "aeolian" vibrations in power transmission cables or like suspended elongate members to prevent the self-destruction of the same and/or of the supporting structures therefor.

2. Description of the Prior Art.

Although vibration dampers for use in the damping of wind generated vibrations in suspended elongate members such as power transmission cables have long been known to take the form, for example, of the "Stockbridge" type damper disclosed in U.S. Pat. No. 1,992,538 of Feb. 26, 1935, it will be readily understood that a variety of not insignificant structural and functional shortcomings have come to light regarding this type of vibration damper. More specifically, since the support members which support the vibration absorbing or inertia weights in the "Stockbridge" type vibration dampers are non-rigid, taking, for example, the form of a seven-strand, braided galvanized cable with inherently poor vibration damping characteristics, it may be understood that the repeated function thereof in transferring vibrational energy to the vibration absorbing weights, and attendant "working" of the cable strands, can and does result in the need for relatively frequent replacement of the damper to forestall structural and/or functional failure of those members. Also, this repeated "working" of, and abrasion by and between these galvanized cable strands, can and does result in the removal of the zinc coating therefrom with attendant undesirable rusting and weakening of the cable strands. Too, since these support members are generally clamped directly to the connecting clamp, which is in turn clamped directly to the power transmission cable, the significant vibration absorbing advantages which are provided by the use of an intermediate vibration damping boundary member of proven vibration damping characteristics as, for example, butyl or neoprene rubber, are unnecessarily sacrificed. This direct, and particularly forceful, clamping of the support cable to the connecting clamp, and the particularly forceful, wedge-type of attachment of the support cable to the inertia weights, in the manufacture of a typical "Stockbridge" type vibration damper, can result in unacceptable damage to the support cable and/or connecting clamp during the damper manufacturing process with attendant increase in the overall cost of damper manufacture. Also, since this connecting clamp of the prior art is generally made of cast iron and is thus relatively heavy, the same adds unnecessarily to the undamped weight of the power transmission cable at the critical point of damper attachment. Further, since the vibration absorbing or inertia weights are generally symmetrically disposed on the "Stockbridge" type dampers, it may be understood that the frequency range through which these prior art dampers exhibit effectively high vibration resistance and real power consumption is unnecessarily limited. In addition, since the vibration absorbing or inertia weights are generally fixedly secured to the support members in the "Stockbridge" type dampers, it becomes difficult and inconvenient, if not, as a practical matter, impossible, to replace those weights with weights of other and different mass characteristics to adapt these prior art dampers to the effective damping of vibrations throughout different frequency ranges as oftentimes may become most desirable for varying vibration damper applications.

OBJECTS OF THE INVENTION

It is, accordingly, an object of this invention to provide a vibration damper for use with power transmission cables or the like which is of particularly durable and reliable construction in that the vibration absorbing or inertia weights are supported from simple, relatively rigid absorber arms.

Another object of this invention is the provision of a vibration damper as above which comprises an intermediate or boundary element of well established, inherent vibration damping characteristics to significantly increase the overall vibration damping efficiency of the vibration damper.

Another object of this invention is the provision of a vibration damper as above wherein the vibration absorbing or inertia weights are asymmetrically supported on the absorber arms to maximize the vibration resistance and real power consumption of the vibration damper throughout a relatively wide frequency range.

Another object of this invention is the provision of a vibration damper as above wherein the vibration absorbing or inertia weights are readily and conveniently replaceable with other such weights of different mass characteristics to thereby enable the ready and convenient adaptation of the vibration damper to effective vibration damping over other and different frequency ranges.

A further object of this invention is the provision of a vibration damper as above which can be readily manufactured at a cost which favorably compares with the manufacturing costs of the less durable and less efficient vibration dampers of the prior art.

SUMMARY OF THE DISCLOSURE

New and improved vibration damper, primarily for use with power transmission cables, is disclosed and comprises a relatively light damper housing which is readily attachable to the cable, and which includes two rubber-metal damper elements mounted therein. First and second, rigid absorber arms, of unequal length, are provided and function to support vibration absorbing weights in readily removable and replaceable manner at the end portions thereof remote from the damper housing. Each of the damper elements is in the nature of a ball joint having an interface of a vibrational energy absorbing material in the nature of rubber, and the absorber arms are respectively connected to the damper elements in such manner that vibrational energy from the cable will be transmitted by, and under the vibrational energy absorbing restraint of, the interface to the absorber arms and vibration absorbing weights for absorption and damping of the cable vibrations.

DESCRIPTION OF THE DRAWINGS

The above and other objects and significant advantages of my invention are believed made clear by the following detailed description thereof taken in conjunction with the accompanying drawings wherein.

DETAILED DESCRIPTION OF THE INVENTION

Figure 2:
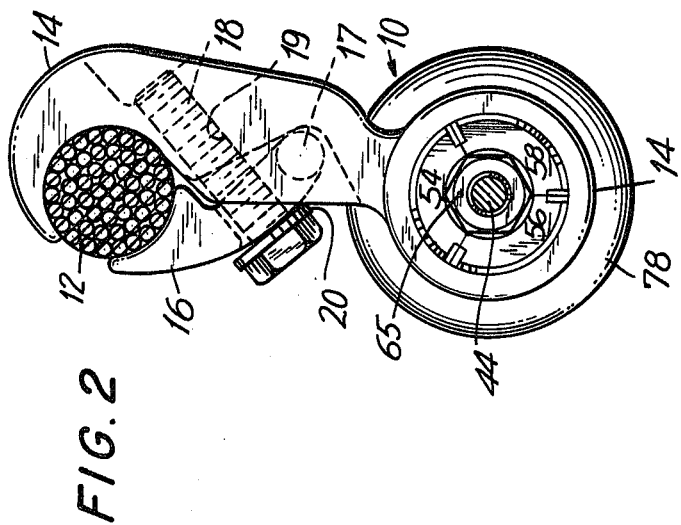
FIG. 2 is a cross-sectional view taken generally along line 2—2 in FIG. 1.
Figure 1:
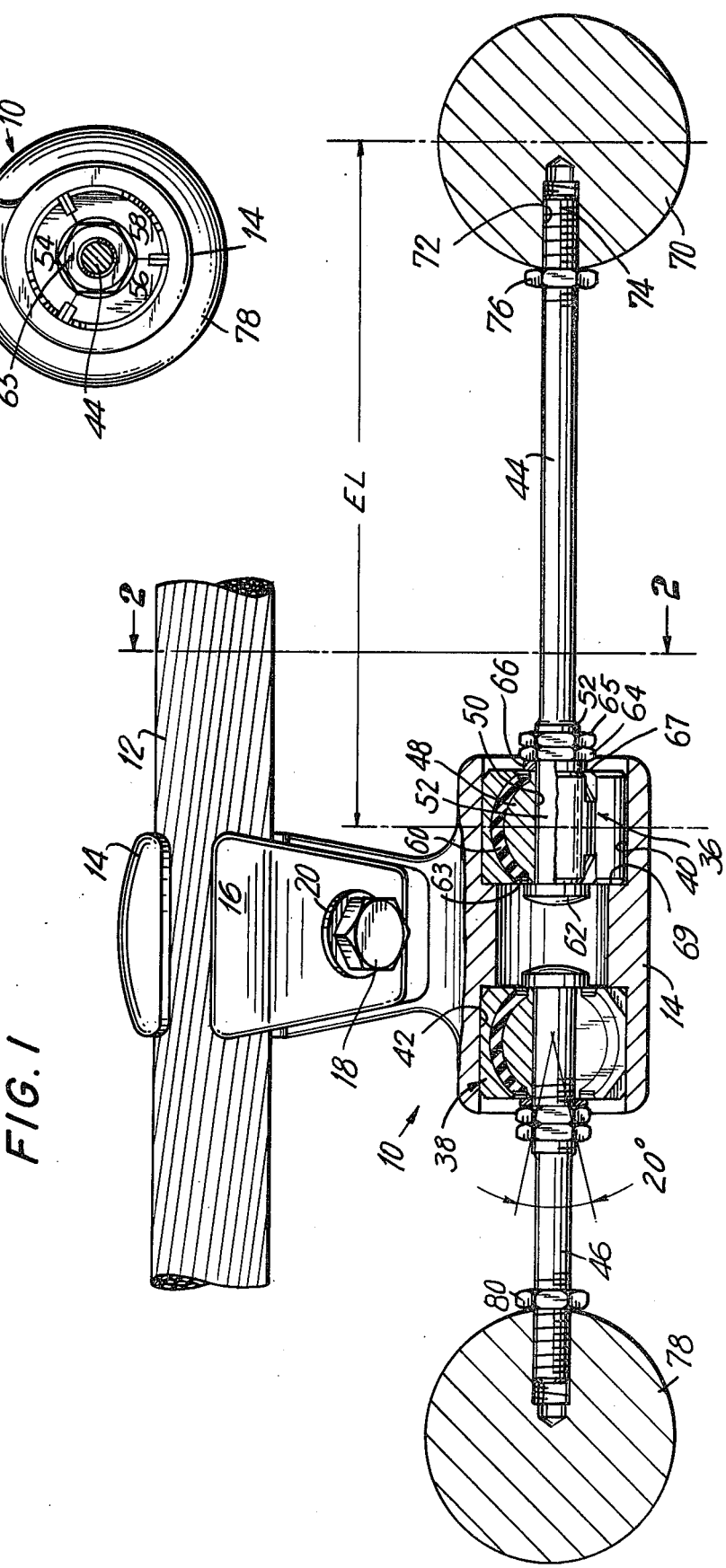
FIG. 1 is a side elevational view of a vibration damper constructed and operatively connected to a power transmission line in accordance with the teachings of my invention, and having parts cut away and parts in cross section for purposes of illustration.

Referring now in detail to FIGS. 1 and 2, a new and improved vibration damper constructed and operative in accordance with the teachings of my invention is indicated generally at 10, and is depicted in operative, supported relationship with a suspended, aluminum based electrical power transmission cable 12 for purposes of damping "aeolian" or wind or air current induced, vibrations taking the form, for example, of standing or mechanical waves in said cable.

The vibration damper 10 comprises a damper housing 14 and a damper cap 16 which is pivotally attached thereto as indicated at 17. Preferably, the damper housing 14 and damper cap 16 are made of a relatively light material in the nature, for example, of cast aluminum which, due to its relatively light weight, cannot appreciably support the natural frequency of vibration of the cable 12. For attachment of the vibration damper 10 to the power transmission cable 12, the respective damper housing 14 and damper cap 16 are tightly clamped as illustrated around said power transmission cable by appropriate tightening of a hex-headed attachment screw 18 into a threaded bore 19 provided therefor in said damper housing. A lock washer 20 is provided to cooperate as shown with damper cap 16 and attachment screw 18 for obvious purpose. The pivotal attachment of damper cap 16 to damper housing 14 functions to greatly facilitate attachment of the vibration damper 10 to the power transmission cable 12, since all that would normally be required would be a few loosening turns of attachment screw 18 in order to enable insertion of the cable between the damper housing and damper cap.

Substantially identical, generally cylindrical rubber-metal damper elements are indicated generally at 36 and 38, and are respectively disposed as shown within mounting bores 40 and 42 provided therefor at opposite sides of the lower portion of damper housing 14.

Rigid absorber arms are indicated at 44 and 46 and are respectively supported by the damper elements 36 and 38 to extend therefrom as shown to opposite sides of the damper housing 14 with freedom for limited pivotal movement relative thereto, all in manner described in detail hereinbelow.

Since the respective, rubber-metal damper elements are substantially identical, both in structure and function, only the element 36 will be described in detail. More specifically, element 36 comprises a generally ball-shaped element 48 having a bore 50 formed therein and through which extends as shown the complementally shaped end portion or shank 52 of the absorber arm 44.

Three, arcuate mounting elements, each of approximately 120° extent, are provided as indicated at 54, 56 and 58, and respectively cooperate to substantially surround the ball-shaped element 48 and provide a generally spherical mounting socket therefor. A generally spherical, boundary element or vibration damping sleeve is indicated at 60 and is disposed as shown in the mounting socket to substantially surround the ball-shaped element 48. The vibration damping sleeve 60 is preferably fabricated from an appropriate semiconducting rubber material of high vibrational energy absorbing capability in the nature, for example, of neoprene or butyl rubber. A material which has proven particularly satisfactory for use in the fabrication of vibration damping sleeve 60 is semiconducting neoprene rubber.

The rubber-metal damper element 36 is fabricated by appropriately positioning the ball-shaped element 48, and the three, arcuate mounting elements 54, 56 and 58 in an assembly fixture or the like in such manner that the mounting elements surround the ball-shaped element 48 with a generally spherical space therebetween. Thereafter, the rubber material is introduced, as by injection or like process, at an appropriately elevated temperature, into the thusly formed space to fill the same and form the vibration damping sleeve 60 with attendant vulcanization of the latter to the ball-shaped element 48 and the respective mounting elements 54, 56 and 58.

Following fabrication of the rubber-metal element 36, the absorber arm 44 is inserted into and moved through the bore 50 in the element 36 until the enlarged, absorber arm head portion 62 comes to bear against the exposed face 63 of the vibration damping sleeve 60. Thereafter, double locking hex nuts as indicated at 64 and 65 are tightened, on an appropriately threaded portion of shank 52 of absorber arm 44 to bear firmly against a washer 66 which bears firmly in turn against the exposed face 67 of the vibration damping sleeve 60 to complete the firm mounting of the absorber arm 44 in the element 36. Note should be taken that metal-to-metal contact between the absorber arm 44 and the damper housing 16 is avoided through use of the exposed faces 63 and 67 of the vibration damping sleeve 60 as the load-bearing surfaces for absorber arm mounting.

Mounting of the thusly completed, rubber-metal element and absorber arm assembly in the damper housing is effected by the press fitting or like forceful insertion of the rubber-metal element 36 into the mounting bore 40 to the operative position depicted in FIG. 1 wherein the relevant faces of the arcuate mounting elements 54, 56 and 58 abut, and are precisely positioned by, the arcuate, rear face 69 of the mounting bore 40.

By the above is believed made clear that the rubber-metal element 36 will function in the nature of a damped ball joint by enabling pivotal movement of the absorber arm 44 relative thereto, with the vibration damping sleeve 60 functioning to appropriately damp this pivotal, absorber arm movement within generally predetermined limits. More specifically, this pivotal movement of the absorber arm relative to the mounting elements of the rubber-metal element 36, and thus to the damper housing 14, will be generally limited to 10° from the axial, for a total range of 20°, as indicated on absorber arm 46 in FIG. 1; it being well understood by those skilled in this art that this 20° range will be utilizable in any direction throughout the full 360° range around the axial.

A spherical, vibration damping weight is indicated at 70 and comprises a generally radial, threaded bore 72. The vibration absorbing weight 70 is attached as shown to the complementally threaded, remote end portion 74 of the absorber arm 44, and a locking hex nut 76 is provided to secure such attachment. A spherical, vibration absorbing weight 78 of the same mass as weight 70 is attached in like manner to absorber arm assembly 46 and secured thereon as shown by hex nut 80. As a result, it will be clearly understood by those skilled in this art that the vibration absorbing weights 70 and 78 may be readily and conveniently removed from the absorber arm 44 and replaced by weights of different mass, and accordingly of different vibration absorbing, characteristics to thereby change the effective absorber damper frequencies and enable the use of the same basic vibration damper 10 with a wide variety of different power transmission cables presenting different vibration frequencies to be damped, with larger weights being effective in the damping of higher frequencies, and vice versa. As a result, it will be clear that inventory requirements for the vibration absorber 10 will be substantially reduced to significant economic advantage.

Of additionally significant advantage regarding the manner in which the vibration absorbing weights 70 and 78 are attached to the absorber arms 44 and 46 is believed the fact that the same enables a limited range of fine adjustment in the position of the vibration absorbing weights at the ends of the absorber arms relative to the damper housing as should be obvious, to thus enable fine adjustment in the effective lengths of the absorber arms, as indicated, for example, by line EL for absorber arm 44 in FIG. 1, and accordingly in the effective vibration absorption frequencies of the absorber, with increase in effective absorber arm length(s) being effective in the damping of higher transmission cable vibration frequencies, and vice versa.

Although a variety of materials may be utilized in the fabrication of the non-rubber components of the damper elements 36 and 38, and of the absorber arms, hex nuts, bolts, and washers, steel has proven to be a preferred material for these components, with SAE 1043 steel being particularly preferred, especially for the absorber arms, because of the demonstrated extremely high durability of that metal. Iron is a preferred material for the vibration absorbing weights, and it is further preferred that the absorber arms, weights, hex nuts, bolts and washers be hot-dip galvanized for prevention of rust due to weather exposure.

As clearly illustrated in FIG. 1, the respective absorber arms 44 and 46 are of unequal lengths, and this inequality of absorber arm lengths and attendant asymmetrical disposition of the vibration absorbing weights 70 and 78 will be readily understood by those skilled in this art to be of particularly significant advantage in functioning to provide two natural frequencies of vibration for the vibration damper 10 of my invention; with attendant, effective damping by the damper of a wide range of frequencies of vibration of the electrical power transmission cable 12.

Although the actual lengths of the absorber arms 44 and 46, and accordingly in the ratio therebetween, may, of course, vary quite widely depending upon the frequency damping requirements of each specific application of the vibration absorber, it may be understood that, for many applications, the ratio between the length of the longer absorber arm and that of the shorter absorber arm will range between a ratio of approximately 1.5 to 1.0, to a ratio of approximately 2.0 to 1.0.

By all of the above is believed made clear that the boundary element or vibration damping sleeves 60 will function as interfaces between the ball-shaped elements 48 and the arcuate mounting elements 54,56 and 58 of the respective bearing assemblies 36 and 38 and thus between the power transmission cable 12 and the vibration absorbing assemblies constituted by the respective absorber arms 44 and 46 and vibration absorbing weights 70 and 78; whereby will be readily understood by those skilled in this art that the vibrational energy from the cable will be transmitted by, and under the significant vibrational energy absorbing restraint of, the rubber sleeves or interfaces 60 to the said vibration absorbing assemblies for vibration of the latter with attendant absorption of the thusly transmitted vibrational energy thereby.

Figure 3:
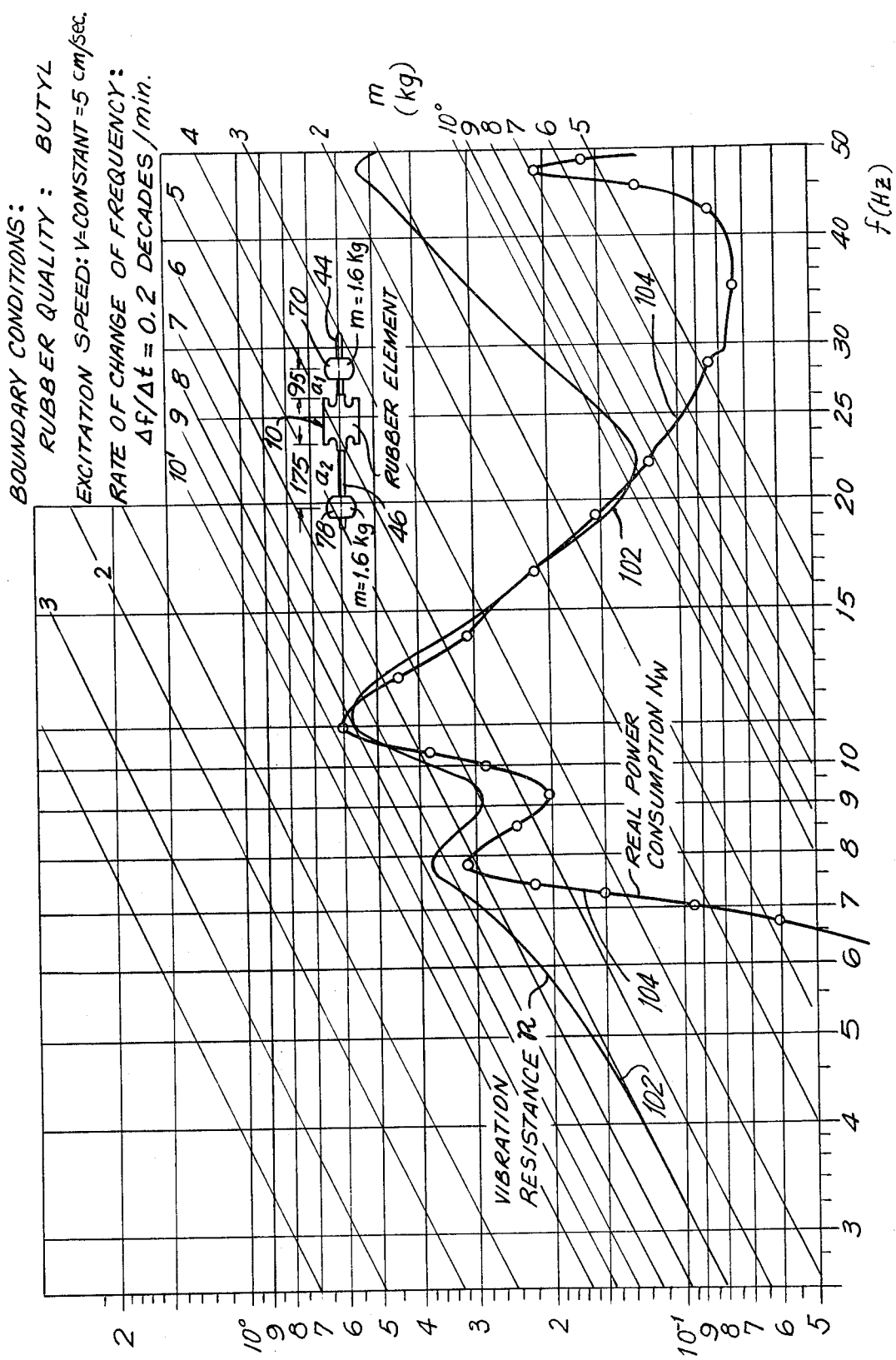
FIG. 3 is a graph illustrating the vibration resistance and the real power consumption of the vibration damper of my invention with assymetrical vibration absorbing weight arrangement under electrodynamic vibration device test conditions.

Referring now in detail to FIG. 3, the same is believed to clearly illustrate the particularly excellent vibration resistance and real power consumption of the vibration damper 10 with the vibration absorbing weights 70 and 78 asymmetrically arranged in the manner depicted in FIG. 1, but with the absorber arm 46 being of greater effective length than the absorber arm 44 as schematically indicated in FIG. 3. More specifically, and with vibration resistance R and real power consumption $N_W$ plotted as functions of frequency f through use of an electrodynamic vibration test device at a constant vibration excitation speed v of 5 centimeters per second with a frequency rate of change $\Delta f/\Delta t$ of 0.2 decades per minute, for the schematically indicated vibration damper arrangement wherein each of vibration absorbing weights 70 and 78 is 1.6 kilograms, absorber arm 44 has an effective length $a_1$ of 95 millimeters, and absorber arm 46 has an effective length $a_2$ of 175 millimeters, curve 102 makes clear that the vibration absorber 10 displays excellent vibration resistance R throughout a frequency range of approximately 10 Hz, from approximately 7.5 Hz to approximately 17.5 Hz. In like manner, curve 104 makes clear that the real power consumption $N_W$ of the vibration damper 10 is, of course, at particularly advantageous high levels throughout that same frequency range. Butyl rubber was used for the boundary elements or vibration damping sleeves 60 of the vibration damper 10 to arrive at the test results of FIG. 3.

Various changes may, of course, be made in the disclosed embodiments of my invention without departing from the spirit and scope thereof as defined in the appended claims.

What is claimed is:

1. In a vibration damper which includes a damper housing and means to attach said housing to a body to damp the vibrations of the latter, the improvements comprising, a damper element supported from said housing, said damper element comprising an interface of a vibrational energy absorbing material, vibrational energy absorbing means pivotally supported from said interface whereby, vibrational energy from said body will be transmitted by, and under the vibrational energy absorbing restraint of, said interface to said vibrational energy absorbing means with attendant absorption of the thusly transmitted vibrational energy by the latter and damping of the vibrations of said body, and wherein said vibrational energy absorbing means comprise a rigid, generally elongate absorber arm extending from said damper element and having one end portion thereof pivotally supported from said interface, a vibration absorbing weight, and attachment means for attaching said weight to the other end portion of said absorber arm.

2. In a vibration damper as in claim 1 wherein, said attachment means are readily removeable whereby, said vibration absorbing weight may be readily replaced by a weight of other and different mass to adapt the vibration damper to other and different vibrational energy damping applications.

3. In a vibration damper as in claim 1 wherein, said attachment means are positionally adjustable whereby, the position of said vibration absorbing weight on said absorber arm may be adjusted to vary the effective length of the latter.

4. In a vibration damper which includes a damper housing and means to attach said housing to a body to damp the vibrations of the latter, the improvements comprising, a damper element supported from said housing, said damper element comprising an interface of a vibrational energy absorbing material, vibrational energy absorbing means pivotally supported from said interface whereby, vibrational energy from said body will be transmitted by, and under the vibrational energy absorbing restraint of, said interface to said vibrational energy absorbing means with attendant absorption of the thusly transmitted vibrational energy by the latter and damping of the vibrations of said body, and wherein said damper element comprises a central, ball-like element, a plurality of arcuate mounting elements mounted in said damper housing and generally surrounding said ball-like element and spaced form the latter, said interface material being disposed in said space in surface contact with said ball-like element and said mounting elements, said vibrational energy absorbing means being attached to said ball-like element.

5. In a vibration damper as in claim 4 wherein, said vibrational energy absorbing material is a rubber material.

6. In a vibration damper as in claim 5 wherein, said rubber material is vulcanized to said ball-like element and said arcuate mounting elements.

7. In a vibration damper as in claim 5 wherein, said ball-like element comprises a mounting bore extending generally centrally thereof, said vibrational energy absorbing means comprise a rigid, generally elongate absorber arm extending from said damper element and having one end portion thereof extending through and mounted in said mounting bore to enable pivotal movement of said ball-like element and absorber arm relative to said damper under the vibrational energy absorbing restraint of said interface, and a vibration absorbing weight attached to the other end portion of said absorber arm.

8. In a vibration damper which includes a damper housing and means to attach said housing to a body to damp the vibrations of the latter, the improvements comprising, first and second damper elements supported from said housing, each of said damper elements comprising an interface of a vibrational energy absorbing material, first and second vibrational energy absorbing means pivotally supported from the respective interfaces of said damper elements and extending therefrom to opposite sides of said damper housing whereby vibrational energy from said body will be transmitted by, and under the vibrational energy absorbing restraint of, said interfaces to said first and second vibrational energy absorbing means with attendant absorption of the thusly transmitted vibrational energy by the latters and damping of the vibrations of said body.

9. In a vibration damper as in claim 8 wherein, said first and second vibrational energy absorbing means comprise rigid, generally elongate absorber arms of unequal effective length having respective end portions thereof pivotally supported from said interface, first and second vibration absorbing weights, and attachment means for attaching said first and second vibration absorbing weights to the respective other end portions of said first and second absorber arms.

10. In a vibration damper as in claim 9 wherein, said first and second vibration absorbing weights are of equal mass.

11. In a vibration damper as in claim 9 wherein, the ratio between the effective lengths of said first and second absorber arms ranges from a ratio of 1.5 to 1.0 to a ratio of 2.0 to 1.0.

12. In a vibration damper as in claim 9 wherein, said attachment means are readily removable whereby, said first and second vibration absorbing weights may be readily replaced weights of other and different mass to adapt the vibration damper to other and different vibrational energy damping applications.

13. In a vibration damper as in claim 9 wherein, said vibrational energy absorbing material is semiconducting neoprene.

14. In a vibration damper as in claim 9 wherein, each of said damper elements comprises a central ball-like element, a plurality of arcuate mounting elements mounted in said damper housing and generally surrounding said ball-like element and spaced from the latter, said interface material being disposed in said space in surface contact with said ball-like element and mounting elements, and said first and second absorber arms being respectively connected to said ball-like elements so as to be pivotally movable therewith under the restraint of said interfaces relative to said damper housing.

15. In a vibration damper as in claim 14 wherein, said interface material is semiconducting neoprene which is vulcanized to said mounting elements and ball-like elements.

* * * * *